March 24, 1970 R. ZANETTI 3,501,791
MANUFACTURE OF FOOTWEAR
Filed April 11, 1968 3 Sheets-Sheet 1
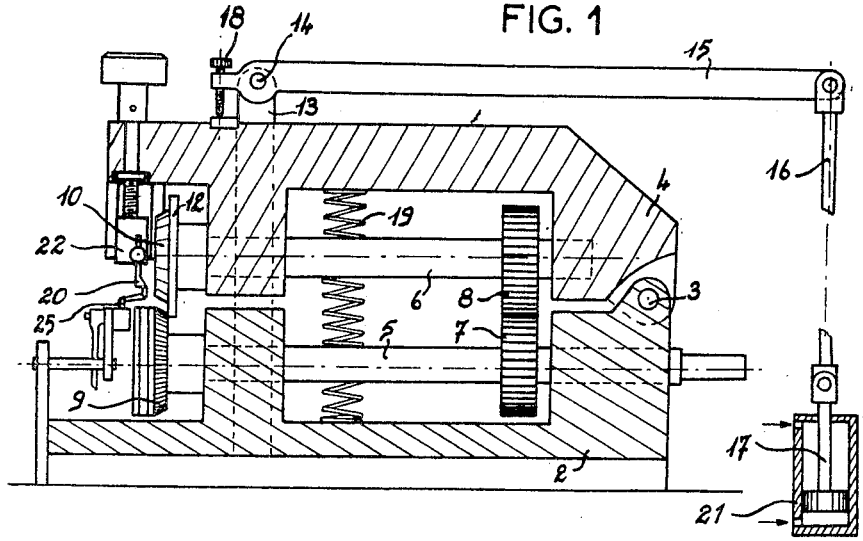

March 24, 1970 R. ZANETTI 3,501,791
MANUFACTURE OF FOOTWEAR
Filed April 11, 1968 3 Sheets-Sheet 3

United States Patent Office 3,501,791
Patented Mar. 24, 1970

3,501,791
MANUFACTURE OF FOOTWEAR
Robert Zanetti, Ile de France Rue du 4 Septembre,
Romans, Drome, France
Filed Apr. 11, 1968, Ser. No. 720,622
Claims priority, application France, June 15, 1967,
48,787
Int. Cl. A43d 45/00, 47/00, 57/00
U.S. Cl. 12—67                                    6 Claims

ABSTRACT OF THE DISCLOSURE

A machine for cutting or partially cutting shoe insoles from their corresponding welts includes a pair of driving rollers which clamp the welt and notch it at the same time and a cutter arranged obliquely so as to make a chamfered cut into the welt to define the insole.

The invention relates to footwear.

A process is known in the shoe industry which is generally called the "Arflex process" and consists of:

(1) Cutting out, by means of a chamfered cut, the insole in the welt of the shoe, while leaving some uncut areas which connect the two pieces of leather.

(2) Glueing onto the sole, the so formed welt and insole, and after glueing withdrawing the insole from the welt, by tearing the uncut areas. With this process, the welt preserves its outer shape obtained by cutting on the former, until it is glued to the sole even though the welt is relatively thin.

The application of this process has so far been limited by the fact that no machine in existence is able to produce the chamfered cut referred to above to separate the insole from the welt.

It is an object of the present invention to obviate or mitigate this disadvantage.

According to the invention there is provided a machine for cutting shoe insoles in their corresponding welts, comprising two superimposed driving rollers rotatable in opposite directions and at the same angular speed, notches formed in the periphery of at least one of said rollers to effect the drive by nipping the edge of the welt and to effect notching of the edge of the welt, and at least one cutter having an oblique blade, fixed or vibratory, which serves to make a chamfered cut into the welt to effect total or partial cutting out of the insole.

With such a cutter having a blade of fixed length and a chamfer of fixed inclination in relation to the horizontal to allow glueing of the insole to the welt from which it has been cut, it can happen, taking into account the variations in the thickness of the sheets of leather out of which the welts are cut, that the said cutter does not emerge from the opposite side of the welt, so that the insole is not completely detached from the latter. To remedy this, a cutter having an upright blade may be associated with the cutter having the oblique blade, but slightly offset in the vertical plane in relation to the first, so as to execute a cut in the face of the welt opposite to the one which the cutter with the oblique blade penetrates, crossing that executed by the said cutter thus allowing the separation of the insole and the welt.

The cutter having the upright blade may be connected to a control mechanism giving it an alternating vertical movement causing it to enter into or come out of the welt and thus form in the latter a discontinuous cut.

An embodiment of the invention will now be described, by way of example only, with reference to the accompanying drawing, in which:

FIGS. 1 and 2 are, respectively, front and side elevation views, partly in section, showing the principle of operation and the disposition of the main elements of a machine according to the invention;

Figure 8:
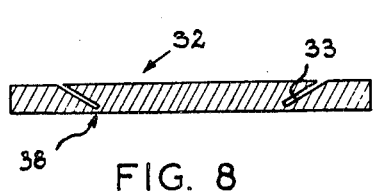
Figure 9:
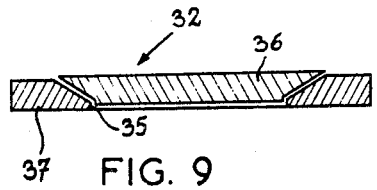
Figure 10:
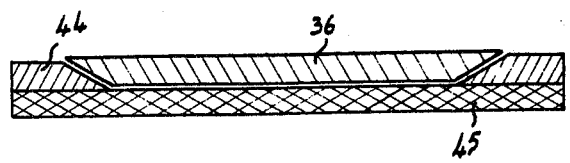

FIGS. 7, 8 and 9 are respectively a top plan view of the welt and sections taken along lines 8—8 and 9—9 in FIG. 7; and, FIG. 10 is a cross-section showing a modification.

Referring to the drawings, the machine consists of a lower member 2 on which an upper member 4 is articulated at 3. Each of these members includes bearings wherein shafts 5 and 6 are borne, the shafts being geared together by gear pinions 7 and 8. As the diameters and the number of teeth of these two gears are equal and the shaft 5 is driven by any known means, these two shafts 5 and 6 rotate in opposite directions at equal angular speeds.

Conical driving rollers 9 and 10 are respectively keyed to the free ends of the shafts 5 and 6. The roller 10 includes a flange 12 projecting from its large diameter end and in contact with the small diameter end of the roller 9. The lower member 2 includes two side arms 13 supporting a shaft 14 on which a lever 15 is rotatably mounted. A push rod 16 is pivoted at one end to the free end of the longest arm of this lever 15 and at the other end to the piston rod 17 of a pneumatic jack 21. The end of the other arm of the lever 15 carries an adjustable stop 18 against which the uper face of the upper member 4 is normally applied by means of a compression coil spring 19 tending to move the two members 2 and 4 apart.

The machine further includes a cutter 20 having an oblique blade fixed in a support 22 carried by the free end of the upper member 4 and adapted for vertical displacement. To allow adjustment of its angle of tilt, the cutter 20 is mounted on the support 22 by means of a cylindrical tool holder 22a adapted to be keyed in any angular position desired. An oscillating support 24 is pivoted at 23 to the lower member 2 and is curved so that its upper portion has a radius substantially equal to that of the roller 9 near which it is disposed. This support 24 carries a vertical cutter 25 projecting radially from the periphery of the driving roller 9. The other arm of the support 24 is connected by a push rod 26 to the moving core of an electro-magnet 27 and is normally supported against an abutment 28 by a tension spring 29. It should be noted, as FIG. 2 shows in greater detail, that the cutter 25 is slightly offset in relation to the point of the cutter with the oblique blade 20 in the vertical plane parallel to the diametral plane of the rollers so that they can cut notches which cross without the cutters coming into contact with one another.

Figure 3:
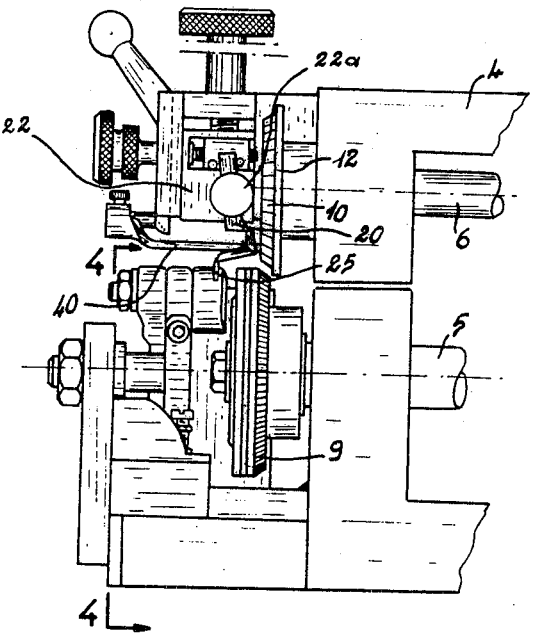
FIGS. 3 and 4 are, respectively, a front elevation view and a sectional view taken along the line 4—4 in FIG. 3 showing a practical embodiment of the machine.
Figure 4:
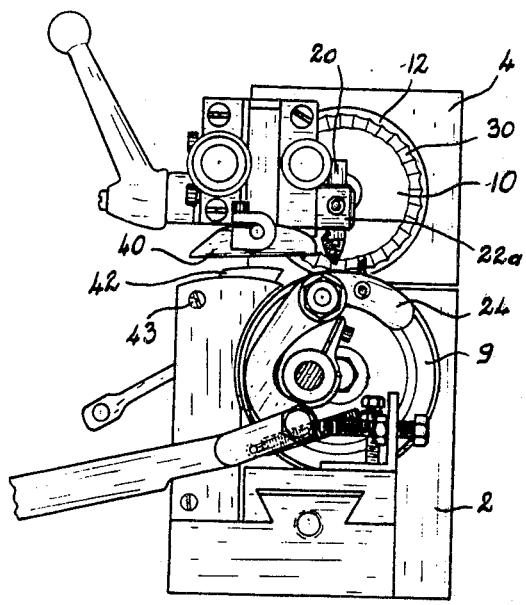
Figure 5:
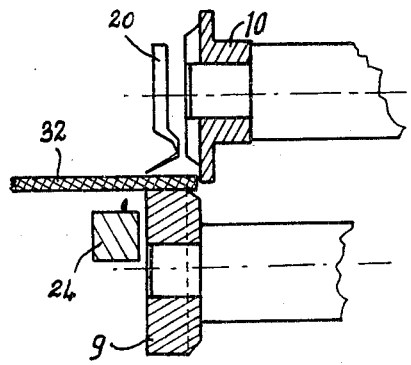
FIGS. 5 and 6 are partial front elevation views, partly in section, showing the driving rollers, respectively in the open position and in the nipping and cutting position.
Figure 6:
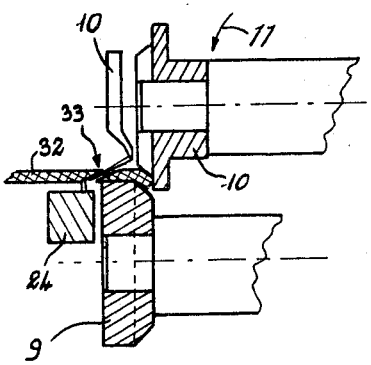

The upper driving roller 10 advantageously carries on its conical part notches 30, and is provided with an internal heating device, not shown, to raise the temperature of the roller 10 to a value sufficient to make supple the pieces of leather to be cut. The tailoring of an insole in a piece of leather, cut out on the exterior to the profile of the corresponding welt, takes place by means of this machine as follows:

When air is supplied below the piston of the pneumatic jack 21, its piston 17 moves upwardly and, by means of the push rod 16 and of the lever 15 causes the upper member 4 to rock around its pivot point 3 in the direction of the arrow 11 in FIG. 6. This rocking causes the roller 10 to descend towards the roller 9. This movement causes the piece of leather 32 to be nipped between the two rollers 9 and 10 so that the notches 30 of the roller 10 are pressed into the corresponding edge of the piece of leatehr 32. Thus the rollers 9 and 10 rotating in opposite directions not only ensure movement of the piece 32 but also the notching of its periphery. The cutter having the oblique blade 20 is then brought down until it penetrates the piece of leather 32 and cuts therein a chamfered notch 33 as FIG. 6 shows.

The cutter 25, having penetrated into the piece 32 through its lower face, simultaneously cuts a substantially vertical notch 35 which will be cut by the oblique cutter 20 which is located behind the cutter 25 so that their respective notches 33 and 35 cross one another. This severs the insole 36, which constitutes the central portion of the piece of leather 32, from the welt 37, formed by the notched edge of the piece 32.

To product a discontinuous severing of this piece of leather 32, that is to leave periodic uncut zones 38 to form lines of contact between the insole 36 and the welt 37, the electro-magnet is excited from time to time, which causes by means of the rod 26 and of the curved support 24, the lowering of the cutter 25 whose point comes out completely from the lower face of the piece of leather 32.

In order to prevent deformation of the welt due to its cutting from the insole and its notching by the notches of the roller 10, the machine is provided with an upper platform 40, fixed to the support 22 of the cutter 20, and a sector 42. This sector is pivoted on the body 2 so that when it is pivoted by a mechanism, not shown, it applies the cut zone of the piece of leather 32 against the said upper platform 40. The leather, still supple due to being heated by the roller 10, is thus straightened out by lamination.

The machine described thus allows the simultaneous cutting of the insole 36 in the welt 37 and the notching of the welt 37. Welts so produced retain their rigidity and their outer profile until glue to the sole because they are joined together by some uncut areas of the insoles corresponding to them.

In a modification, the machine is provided with two cylindrical rollers, of which at least one is notched, and does not include the vertical cutter 25 which allows it to be used in one and the same operation, to press, chamfer, shape and notch a linear welt 44 disposed with its inner face coated with glue on a sole 45 as shown in FIG. 10.

I claim:
1. A machine for cutting shoe insoles in corresponding welts in a piece of leather, said machine comprising two superimposed driving rollers rotatable in opposite directions and at the same angular speed, at least one of said rollers having a periphery with notches to effect advance of the piece of leather by nipping the edge of the welt and effecting notching of the edge of the welt, at least one cutter having an oblique blade to produce a chamfered cut between the insole and the welt to permit subsequent separation of the insole and welt, and an upright blade associated with the cutter, and slightly offset therefrom, in a vertical plane to produce a cut in the face of the welt opposite that made by the cutter and crossing the same.

2. A machine according to claim 1 in which the upright blade is disposed at the level of the driving roller on which the leather piece is placed, the machine further comprising means for alternately vertically displacing the upright blade to pass into and out of the leather and thus form therein a discontinuous cut.

3. A machine according to claim 1 including means for vibrating said oblique blade.

4. A machine according to claim 1 in which the two driving rollers are conical and of opposite conicity so as to impart to the welt which they nip a translational movement bringing the edge of the welt against the cheek of one of the rollers and thus ensuring the precise positioning of the notching.

5. A machine according to claim 1 in which the roller provided with notches is heated to a temperature sufficient to set the leather so as to make its notching permanent.

6. A machine according to claim 1 comprising an adjustable pusher and a fixed platform disposed downstream of the nip of the two rollers, against which the welt is applied by said adjustable pusher and is thus laminated and straightened.

References Cited

UNITED STATES PATENTS

| | | | |
|---|---|---|---|
| 1,278,956 | 9/1918 | Lucas | 12—67 |
| 2,166,960 | 7/1939 | Lyon | 12—67 |
| 2,559,813 | 7/1951 | White | 12—67 |

PATRICK D. LAWSON, Primary Examiner